US012770321B2

(12) United States Patent
Vohra et al.

(10) Patent No.: US 12,770,321 B2
(45) Date of Patent: Oct. 20, 2026

(54) HANDS MATTING RESPONSIVE TO LOW LIGHT CONDITIONS

(71) Applicant: Apple Inc., Cupertino, CA (US)

(72) Inventors: Sanchit Vohra, Sunnyvale, CA (US); Johan V. Hedberg, Foster City, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 18/675,828

(22) Filed: May 28, 2024

(65) Prior Publication Data

US 2024/0404186 A1 Dec. 5, 2024

Related U.S. Application Data

(60) Provisional application No. 63/568,151, filed on Mar. 21, 2024, provisional application No. 63/505,956, filed on Jun. 2, 2023.

(51) Int. Cl.
*G06T 15/50* (2011.01)
*G06T 19/00* (2011.01)

(52) U.S. Cl.
CPC .......... *G06T 15/503* (2013.01); *G06T 19/006* (2013.01)

(58) Field of Classification Search
CPC .. G06T 3/04; G06T 3/001; G06T 5/50; G06T 7/194; G06T 7/50; G06T 7/70; G06T 7/11; G06T 7/12; G06T 7/74; G06T 11/40; G06T 15/005; G06T 15/506; G06T 15/503; G06T 15/50; G06T 15/80; G06T 15/60; G06T 15/06; G06T 17/05; G06T 19/006; G06T 19/00; G06T 2207/10028; G06T 7/90; G06T 19/20; G06T 2219/2012; G06T 2207/20164; G06T 2207/20104; G09G 5/377; G09G 5/10; G09G 5/08; G07C 5/02; G01S 17/89; G01S 17/931; G05D 1/0231; G06N 20/00; G06V 40/107
USPC .......................................................... 345/426
See application file for complete search history.

(56) References Cited

U.S. PATENT DOCUMENTS

| | | | | | |
|---|---|---|---|---|---|
| 11,887,263 | B1 * | 1/2024 | Atlas | G02B 27/0172 | |
| 2006/0269111 | A1 * | 11/2006 | Stoecker | G16H 30/40 | 382/128 |
| 2009/0167682 | A1 * | 7/2009 | Yamashita | G06F 3/011 | 345/158 |

(Continued)

FOREIGN PATENT DOCUMENTS

| | | |
|---|---|---|
| KR | 20150078275 | 7/2015 |
| KR | 20230069433 | 5/2023 |
| WO | 2019046334 A1 | 3/2019 |

*Primary Examiner* — Gordon G Liu
(74) *Attorney, Agent, or Firm* — Blank Rome LLP

(57) ABSTRACT

Managing hands matting based on light conditions includes receiving image data comprising a hand, and determining a brightness in the image data. If the brightness in the first image data satisfies the brightness threshold, hands matting is performed on the image data to extract the hand from the image data and the image data is blended with virtual content in accordance with the extracted hand. If the brightness in the first image data satisfies a disablement threshold, hands matting is disabled and the image data is blended with virtual content without extracting the hand. An alternative representation of the location of the hand is depicted in the final image.

20 Claims, 13 Drawing Sheets

(56) References Cited

U.S. PATENT DOCUMENTS

| | | | | |
|---|---|---|---|---|
| 2014/0140579 | A1* | 5/2014 | Takemoto | G06T 7/593 382/106 |
| 2017/0358092 | A1 | 12/2017 | Bleibel | |
| 2022/0053142 | A1* | 2/2022 | Manzari | H04N 23/69 |
| 2023/0014448 | A1 | 1/2023 | Gonzalez Morin | |

* cited by examiner

HANDS MATTING RESPONSIVE TO LOW LIGHT CONDITIONS

BACKGROUND

With the rise of extended reality technology, users are more frequently using pass through devices in which a view depicts virtual objects along with physical objects. These devices often allow a user's hands to be seen in the view of a mixed reality environment along with virtual content. For example, some extended reality technologies allow a user to interact with virtual content using their hands.

One difficulty that arises is when extended reality is used in a low light environment and hands are visible in the scene. Characteristics within the physical environment may be difficult to detect. This may cause difficulty in extracting a hand from an image, which may result in a modified functionality in extended reality technology.

DETAILED DESCRIPTION

Figure 1A:
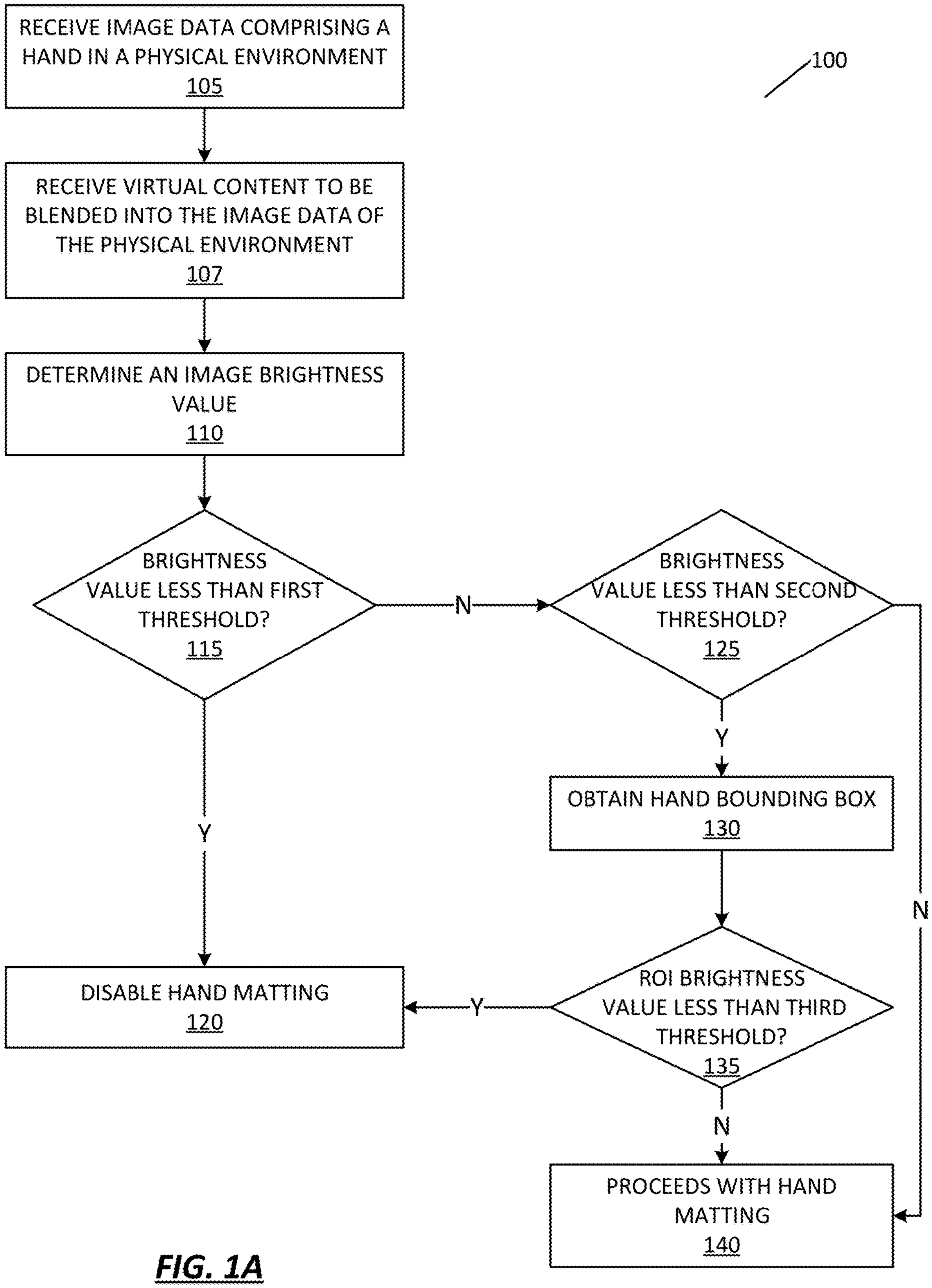
FIGS. 1A-1B show flowcharts of example techniques for managing hands matting in a mixed reality environment in accordance with lighting conditions, according to one or more embodiments.

This disclosure relates generally to image processing. More particularly, but not by way of limitation, this disclosure also relates to techniques and systems for managing hands matting in response to lighting conditions in a scene.

This disclosure pertains to systems, methods, and computer readable media to blend image data having a hand with virtual content image data. In particular, this disclosure pertains to techniques for enabling or disabling hands matting based on a brightness level of the scene. According to some embodiments, extended reality applications may utilize hands matting for enhancing a user's interaction with an extended reality environment. The hands matting technique may be used to identify a hand from image data. The region of the image data that includes the hand can be used to modify how the hand is presented in the mixed reality environment. For example, the user wearing a headset can interact with virtual content in an environment with their hands. Hands matting may be used to determine where the hand is in a frame in order to modify presentation of the physical environment and/or virtual content so as to provide a user perspective information between the hand and the virtual content placed in the scene. According to some embodiments, hands matting involves applying the image data to a model to obtain coefficients indicating a likelihood that a particular pixel or region of the image belongs to a hand. The coefficients can then be used to blend camera data, from the current image and/or from additional image frames, with virtual content in a manner that provides a visual indication of the hand in space relative to virtual content in the scene.

Brightness may be determined in a number of ways. For example, one or more lumens values can be determined from image data of the physical environment, such as image data captured by a pass-through camera. A brightness may be determined based on the luminance for the frame, or a portion of the frame. For example, a luminance for a region of the frame that includes one or both hands may be used to determine brightness. Alternatively, or in addition, one or more lumens values can be determined from physical sensors that capture brightness values by measuring scene brightness of the physical environment, such as a reading taken by an ambient light sensor. Alternatively, or in addition, a separate model can measure the scene brightness using either or both the image data and sensor readings. According to some embodiments, the operation of hands matting techniques may dynamically change based on characteristics of the scene. For example, if an overall brightness of the frame falls the low a critical threshold, then hands matting may be disabled. However, if an overall brightness of the frame falls below a different threshold, then a brightness within a region of the frame having one of the hands may be compared against one or more brightness thresholds. Based on this comparison, hands matting will either be utilized or will be disabled. According to some embodiments, compute may be saved by only using a region of the frame that includes the hand data when the particular threshold is met, thereby reducing the need to track the location of the hand or hands in a frame. Alternatively, in some embodiments, alternative hands matting models may be used for low light conditions. For example, an alternate hands matting model may be configured to perform hands matting using images captured in low light or within a range of measured image brightness values.

Once hands matting is disabled, it may be re-enabled based on one or more brightness metrics which may be the same or different to those used for disabling hands matting. For example, if brightness of the frame is determined to satisfy an enablement threshold, then hands matting may be turned back on. In some embodiments, the brightness of the frame used to determine whether the enablement ritual is satisfied may be a full frame, or one or more regions of the frame that include the hands. In some embodiments, alternative techniques can be performed when hands matting is disabled to provide visual cues as to the location of the hand with respect to virtual content in a scene. For example, hand tracking data can provide location data for a hand in the image using different techniques and potentially different data than the hands matting model. For example, the hand tracking technique may provide three-dimensional location information for one or more points of the hand, such as joint locations. This location information may be used in low light to draw a geometry around the hand to which a low alpha value can be applied such that the portion of the image data including the hand will shine through in a resulting composite image.

Another alternative embodiment may include rendering a geometry of the hand in low light conditions. According to some embodiments, the hand tracking pipeline may produce a hand mesh. The mesh may be a three-dimensional geometric representation of the user's hand based on joint locations. The mesh may be based on a generic hand shape, or a user-specific hand shape. In some embodiments, the mesh may be rendered such that the shape of a hand is presented in the composite image to provide a visual clue as to where the user's hand is located in relation to the virtual content. In some embodiments, a user-specific mesh may be rendered which is specific to the geometry of the user's hand and, optionally, may be rendered using user-specific texture such that the rendered mesh appears as if it is the user's hand.

In the following description, for purposes of explanation, numerous specific details are set forth in order to provide a thorough understanding of the disclosed concepts. As part of this description, some of this disclosure's drawings represent structures and devices in block diagram form, in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, or to resort to the claims being necessary to determine such inventive subject matter. Reference in this disclosure to "one embodiment" or to "an embodiment" means that a particular feature, structure, or characteristic described in connection with the embodiment, is included in at least one embodiment of the disclosed subject matter, and multiple references to "one embodiment" or "an embodiment" should not be understood as necessarily all referring to the same embodiment.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

For purposes of this disclosure, the term "mixed reality environment" refers to a view of an environment that includes virtual content and physical content, such as image data from a pass-through camera or some view of a physical environment.

FIG. 1A shows a flowchart of a technique for managing hands matting in a mixed reality environment in accordance with lighting conditions, according to one or more embodiments. For purposes of explanation, the processes described below are described as being performed by particular components. However, it should be understood that the various actions may be performed by alternate components. In addition, the various actions may be performed in a different order. Further, some actions may be performed simultaneously, and some may not be required, or others may be added.

The flowchart 100 begins at block 105, where image is received comprising a hand in a physical environment. The image data may be pass-through camera data. For example, electronic device may include a monocular camera, stereo camera, and/or depth sensor or other sensors which may be utilized to capture images and/or other sensor data of a physical environment for presentation on a display. In some embodiments, additional or alternative camera data may be used, such as data collected from infrared cameras or the like.

At block 107, the flowchart 100 includes receiving virtual content to be blended into the image data of the physical environment. According to one or more embodiments, the virtual content may be associated with one or more augmented reality applications, and may be configured to be presented in the view of the physical environment. According to some embodiments, the virtual content may be generated locally on device, or may be received from a remote device.

The flowchart 100 continues at block 110, where image brightness is determined. As will be described below, the image brightness can be determined in a number of ways. For example, a luminance value may be determined from one or more pixels of the particular image frame. In some embodiments, a sample of pixels may be used for an image frame. The overall luminance for the pixels may be determined, for example, based on a totality of the luminance, a mean or median luminance value, or the like. In some embodiments, a luminance value may be used as a proxy for brightness, or may be translated into a brightness value using a predefined function. Additional or alternative techniques can be used to determine brightness in some embodiments. For example, a camera capturing the view of the physical environment may determine various signals related to the brightness of the scene, such as auto exposure. As another example, an ambient light sensor or other brightness sensor may provide a signal which may be used to determine the brightness of the scene.

The flowchart 100 continues to block 115, where a determination is made whether the brightness value is less than a first brightness threshold. The first threshold may be a critical threshold brightness at which the overall brightness of the scene is determined to be insufficient to use hands matting. For example, the first brightness threshold may indicate a brightness value at which a hands matting technique may be determined to likely fail or be unreliable. If a determination is made at block 115, that the brightness value is less than the first threshold, then the flowchart 100 concludes at block 120, and hands matting is disabled. According to some embodiments, by disabling hands matting when the environment lighting indicates that the resulting hands matting data may fail or be unreliable, compute is a when generating a composite image in which the hand is present. In some embodiments, the techniques may be applied to any physical object in the image data. Rather than disabling hands matting, an extraction technique for obtaining a mask for the physical object may be enabled or disabled based on lighting.

Returning to block 115, if a determination is made that the brightness value is not less than the first threshold, then a determination is made at block 125 as to whether the brightness is less than a second threshold. According to some embodiments, the second threshold may be a brightness value which is greater than the first threshold, but at which additional information is needed to determine whether resulting hands matting information will likely fail or be unreliable. In some embodiments, the overall brightness of the scene may not be so dim that the system can conclusively determine that hands matting should be disabled. Thus, the second threshold is an intermediate threshold which indicates when a brightness value falls below the second threshold, then additional data should be considered. Thus, if a determination is made that the region of interest brightness is not less than the second threshold, then the flowchart concludes at block 140, and the image data is blended with virtual content using hands matting. By contrast, if a determination is made at block 125 that brightness value is less than the second threshold, then the flowchart proceeds to block 130.

At block 130, a hand bounding box is obtained which can determine a hand region of a frame. In some embodiments, the system may run a hand tracking pipeline separate from the hands matting pipeline. The image data capturing a surrounding environment may be used to extract hand features by the hand tracking pipeline. According to one or more embodiments, a network may be trained to read in sensor data, such as a 2D image frame, and generate hand features, such as a bounding box delineating a hand region of the image. The region of the image data that includes the bounding box may be determined to be a region of interest. In some embodiments, if the technique is performed with respect to a different physical object, the bounding box may be determined as a region of interest that includes the physical object.

The flowchart 100 proceeds to block 135, where a region of interest brightness value is compared to a third threshold. According to some embodiments, the region of interest brightness value may be determined based on the brightness value for pixels within the region of interest as described above with respect to block 110. The pixels used to determine brightness at block 135 may include some of the pixels described above with respect to block 110 or may include additional pixels not previously considered at block 110.

If a determination is made at block 135 that the region of interest brightness is less than the third threshold, then the flowchart concludes at block 120, and hands matting is disabled. To that end, the first threshold and the third threshold may be the same value, or may be different values. By contrast, if a determination is made that the region of interest brightness is not less than the third threshold, then the flowchart concludes at block 140, and the image data is blended with virtual content using hands matting or other mask data related to the physical object. According to some embodiments, hands matting involves performing a hands matting process to obtain or determine attributes of a hand in the image data. According to some embodiments, the hands matting process includes applying the image data to a model to obtain coefficients indicating a likelihood that a particular pixel or region of the image belongs to a hand. The coefficients can then be used to blend image data, from the current image frame and/or from additional image frames, with the virtual content obtained at block 107 in a manner that provides a visual indication of the hand in space relative to virtual content in the scene. For example, coefficients determined for a particular frame or frames of an image data stream, may be used to blend virtual content with another portion of the image data stream.

According to some embodiments, the various threshold values, such as the first threshold in block 115, the second threshold in block 125, and the third threshold in block 135 may be based on a static, predefined value. Additionally, or alternatively, one or more of the various threshold values may be dynamic values, or may be adaptive values. For example, one or more of the threshold values may be determined based on contextual characteristics of the environment, the device, or the user. These factors may include, for example, enrollment data for a user, hands matting model accuracies, or the like.

Figure 1B:
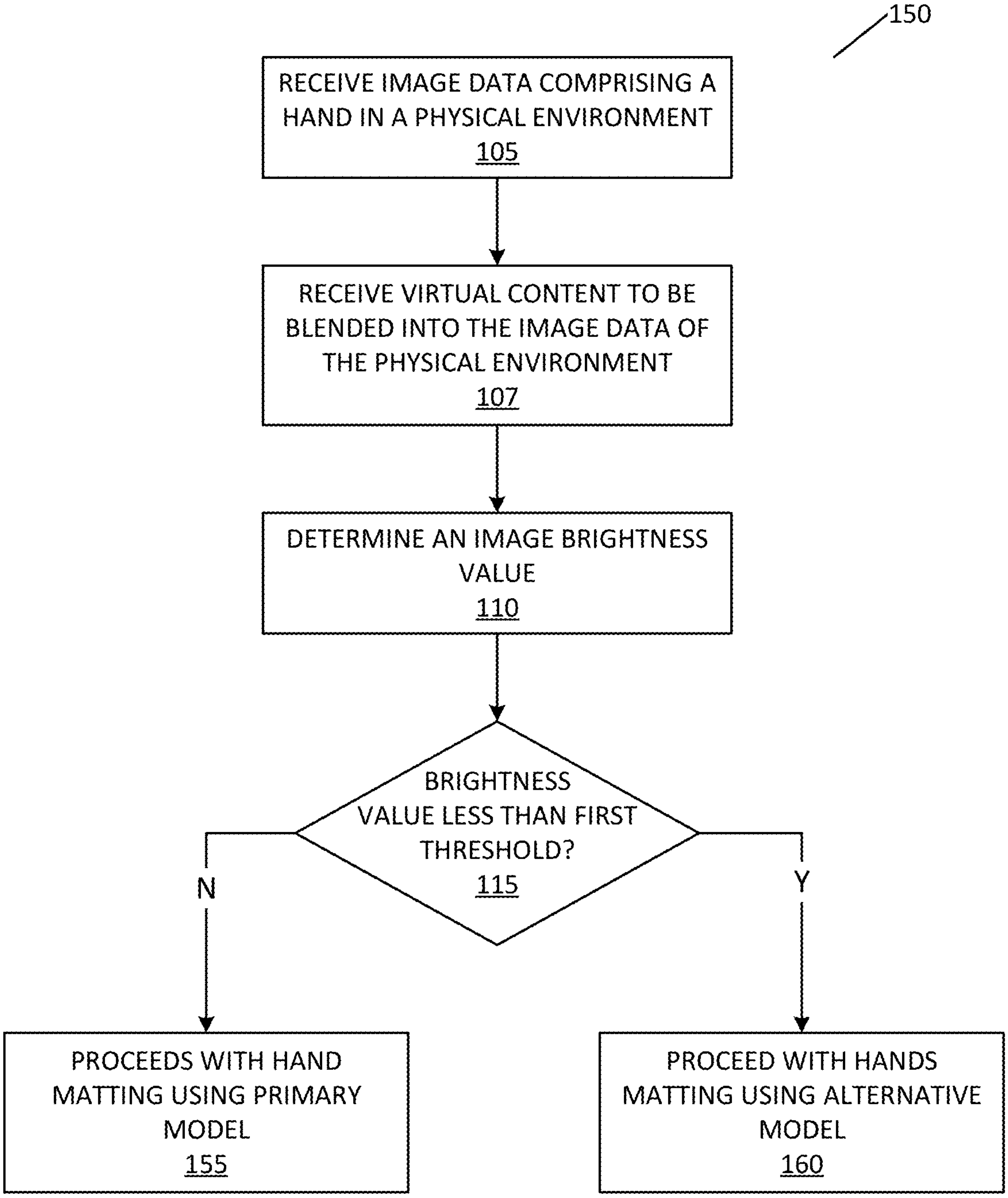

FIG. 1B shows a flowchart of an alternative technique for managing hands matting in a mixed reality environment in accordance with lighting conditions, according to one or more embodiments. For purposes of explanation, the processes described below are described as being performed by particular components. However, it should be understood that the various actions may be performed by alternate components. In addition, the various actions may be performed in a different order. Further, some actions may be performed simultaneously, and some may not be required, or others may be added.

Similar to above, flowchart 150 includes steps 105-115, as described above with respect to FIG. 1A. In short, the flowchart 150 includes, at block 105, receiving image data comprising a hand in a physical environment. At block 107 virtual content is received which is to be blended into a view of the physical environment. At block 110, an image brightness value is determined.

The flowchart 100 continues to block 115, where a determination is made whether the brightness value is less than a first brightness threshold. The first threshold may be a critical threshold brightness at which the overall brightness of the scene is determined to be insufficient to use hands matting. If a determination is made that at block 115 that the brightness is not less than the threshold, then the flowchart proceeds to block 155.

At block 155, hands matting is performed using a primary model. According to some embodiments, hands matting involves performing a hands matting process to obtain or determine attributes of a hand in the image data. According to some embodiments, the hands matting process includes applying the image data to a model to obtain coefficients indicating a likelihood that a particular pixel or region of the image belongs to a hand. In some embodiments, multiple models may be available and configured to perform under different conditions. A primary hands matting model may be configured to work in well-lit environments. The coefficients can then be used to blend image data, from the current image frame and/or from additional image frames, with the virtual content obtained at block 107 in a manner that provides a visual indication of the hand in space relative to virtual content in the scene.

Returning to block 115, if a determination is made that the brightness is not less than the threshold, then the flowchart proceeds to block 160. At block 160, an alternative hands matting model may be used to generate coefficients. The alternative model may be configured to perform using low light conditions, or may provide other tradeoffs with respect to power and accuracy. For example, a hands matting model that works in low light conditions may require more system resources to attain a level of accuracy if the hand were present under regular lighting. As another example, the output of the alternate model may be of a lower quality than the primary hands matting model. For example, the output of the alternative hands matting model may be less accurate as to the outline of the hand, thereby causing a stencil of the hand defined by the coefficients to be blurred. The coefficients can then be used to blend image data, from the current image frame and/or from additional image frames, with the virtual content obtained at block 107 in a manner that provides a visual indication of the hand in space relative to virtual content in the scene.

Figure 2:
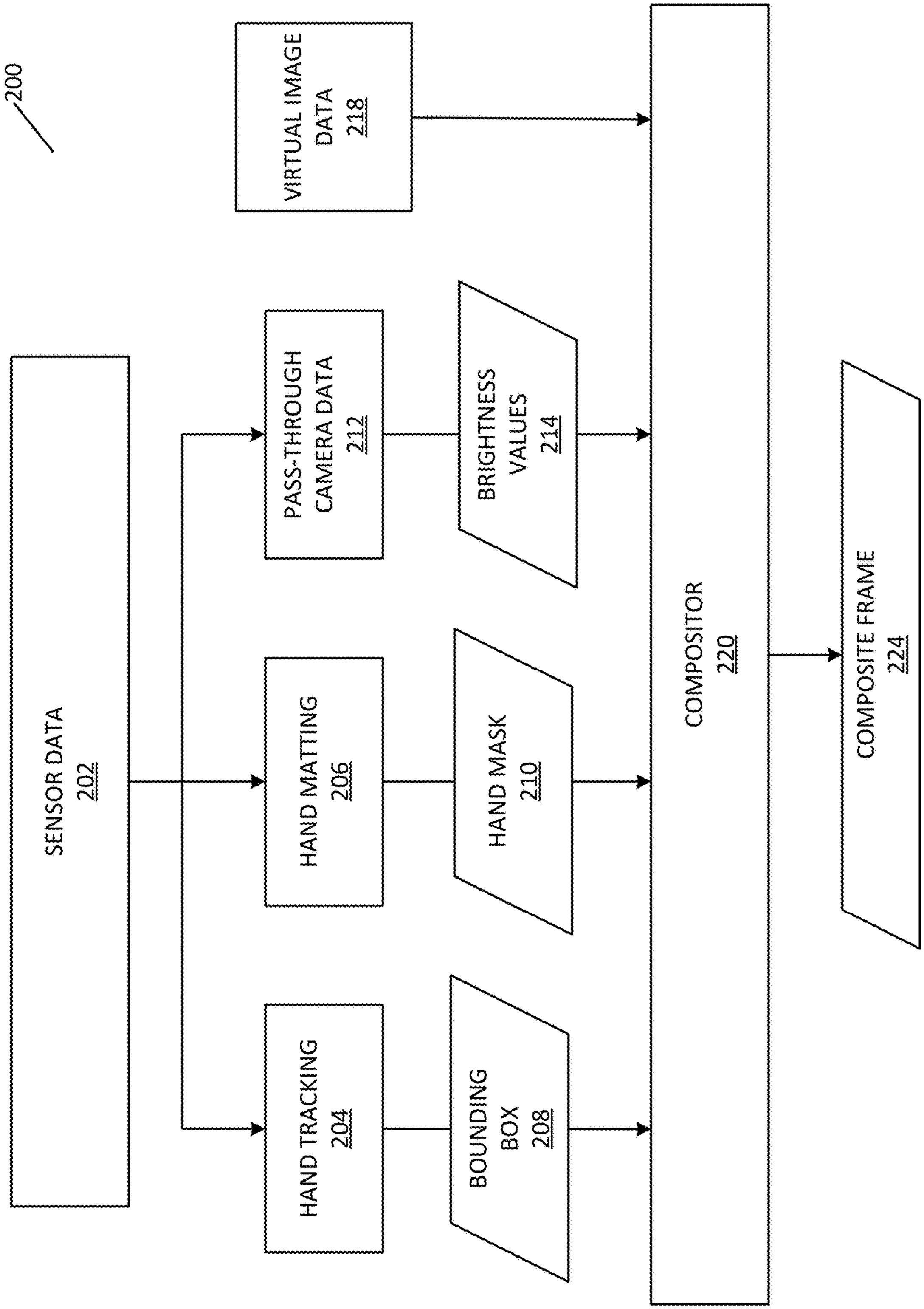
FIG. 2 shows a flow diagram of a technique for generating a view of a hand in a mixed reality environment, according to one or more embodiments.

FIG. 2 shows a flow diagram of a technique for generating a view of a hand in a mixed reality environment, according to one or more embodiments. For purposes of explanation, the processes described below are described as being performed by particular components. However, it should be understood that the various actions may be performed by alternate components. In addition, the various actions may be performed in a different order. Further, some actions may be performed simultaneously, and some may not be required, or others may be added.

The pipeline 200 begins by collecting sensor data 202. The sensor data 202 may be collected by one or more cameras or other sensors of an electronic device, such as a head mounted device or other wearable device or mobile device. For example, electronic device may include a monocular camera, stereo camera, and/or depth sensor or other sensors which may be used to capture images and/or track objects in a scene. In some embodiments, the one or more cameras may include a scene camera configured to capture images of an environment in front of the device.

The pipeline include a hand tracking module 204. The hand tracking module may use image data and/or depth data of a user's hand from sensor data 202 to determine characteristics of the hand. This may include, for example, joint locations, pose, depth, position, orientation, and the like. The hand or hands of the user are monitored, for example, using a vision-based tracking process. The vision-based tracking process may utilize image data captured by a camera of electronic device. The hand tracking module 204 may include a hand tracking network, which is trained to estimate a physical state of a user's hand or hands. In some embodiments, the hand tracking module 204 may provide a bounding box 208 for each or both hands in the view. The bounding box 208 may be determined for each frame of sensor data 202, or may be determined upon being triggered based on lighting characteristics of the environment. In some embodiments, the hand tracking module 204 may be configured to generate a representation of the geometry of the hand pose, for example in the form of a mesh. The mesh may be a generic hand mesh representing the pose of the hand, or may be specific to the user. For example, in some embodiments, the hand tracking module 204 may be configured to represent the pose of the hand using user-specific geometry, for example from enrollment data.

In some embodiments, a hands matting module 206 may be used to determine a hand mask 210. The hand mask 210 may be a shape or geometry of a hand and/or arm, which is recognized by the user device. The hand mask 210 may be determined based on a model trained to predict the hand mask from the sensor data 202.

The compositor 220 also receives image data from which the composite image is generated. In particular, the sensor data 202 may include pass-through camera data 212 providing a view of the environment. The pass-through camera data 212 may be associated with brightness values 214 derived from the luminance of the pixels comprised in the pass-through camera data. In addition, virtual image data 218 may be provided which is to be presented in a view of the environment. The virtual image data 218 may be generated from an application on the local device, may be received from a remove device, or some combination thereof. The compositor 220 may be configured to blend the virtual image data 218 into the pass-through camera data 212 to generate a composite frame 224. If hands matting module 206 is activated and providing a hand mask 210, the compositor may blend the virtual image data 218 with the pass-through camera data 212 in accordance with the hands matting module 206.

Figure 3:
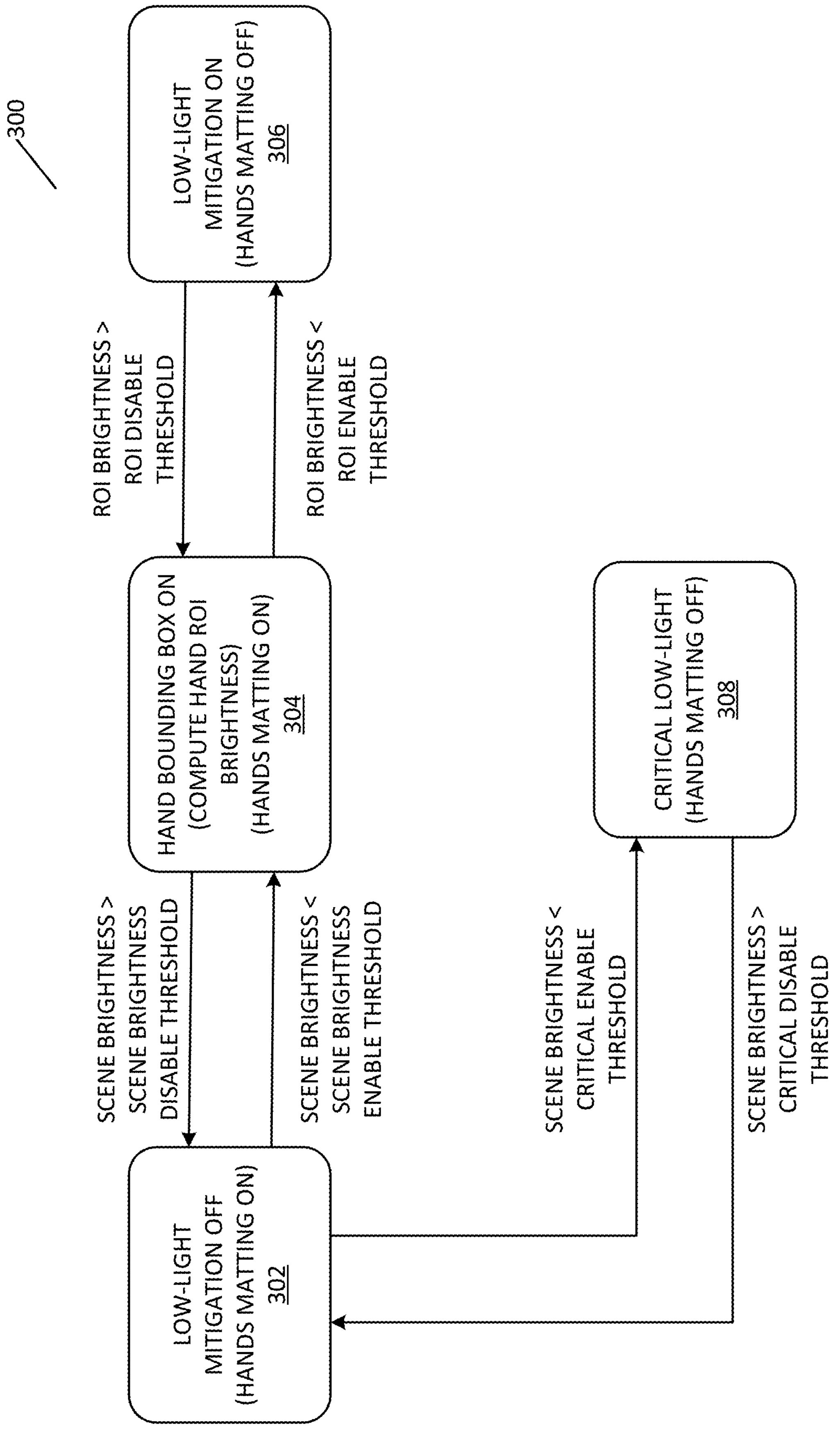
FIG. 3 shows a state diagram of a technique for managing hands matting based on lighting conditions, according to one or more embodiments.

Hands matting may be enabled and disabled based on environmental lighting using various techniques. FIG. 3 shows a state diagram of a technique for managing hands matting based on lighting conditions, according to one or more embodiments. In particular, the state machine of FIG. 3 depicts a technique for initiating and terminating a low-light mitigation function which is configured to trigger the enablement and disablement of hands matting.

The state diagram 300 begins at block 302, where low-light mitigation is off. When the like mitigation is off, hands matting is enabled. As a result, composite images may be generated blending virtual content into a view of a physical environment in accordance with a hand mask provided by a hands matting pipeline. The hands matting pipeline may be configured to determine a hand mask based on image data. The image data may be the pass-through image data, and/or may be image data captured by an alternative camera source, such as an infrared camera, or other camera. In some embodiments, if the hand mask is determined using an alternative camera source, additional image data can be obtained from the alternative camera source concurrently with the pass-through camera. The pass-through camera data may be reprojected to the additional camera data, and the hand may be extracted from the pass-through camera data in accordance with the reprojection.

When hands matting is on and low-light mitigation is off, a scene brightness value can be determined. As described above, the scene brightness value can be determined in a number of ways. For example, a brightness value can be derived from a luminance of one or sampled pixels in a frame of sensor data capturing the scene. If the scene brightness is less than the critical enable threshold, then the state diagram transitions to block 308, where the system is determined to be a critical low-light state. This may occur, for example, when a brightness level of the scene is considered to be so dim that a hand mask generated by a hands matting pipeline using image data of the scene may be unreliable. During the critical low-light state at block 308, hands matting is turned off or otherwise disabled, according to some embodiments.

While the system is in a state of critical low light, as shown at block 308, a determination may be made as to whether the scene brightness for a given frame is greater than a critical disable threshold. According to some embodiments, the critical disable threshold may indicate a threshold brightness value at which a brightness level of the scene is considered to be sufficiently bright such that a hand mask generated by a hands matting pipeline using image data of the scene may be reliable. When the scene brightness is determined to exceed the critical disable threshold, then the state diagram 300 may transition back to block 302, where low-light mitigation is turned off, and hands matting is enabled. In some embodiments, the critical enable threshold and the critical disable threshold may be different values, or may be a same brightness value.

From block 302, scene brightness can be compared against a scene brightness enable threshold which is different than the critical threshold. The scene brightness enable threshold may be a brightness value which is greater than the critical threshold, but at which additional information is needed to determine whether resulting hands matting information will likely fail or be unreliable. Thus, if the scene brightness is determined to fall below the scene brightness enable threshold, then the state diagram 300 transitions to block 304, and a hand bounding box is tracked. In some embodiments, from block 302, if the scene brightness is determined to be below the critical threshold, the scene brightness may also be below scene brightness enable threshold. However, the determination as to whether the scene brightness level of the critical disable threshold will override a determination of the scene brightness falling below the scene brightness enable threshold.

At block 304, a hand bounding box is tracked. This may include, for example, enabling or initiating a hand tracking system to begin determining a bounding box around one or more of the hand scene image data. The bounding box may correspond to a hand region of interest in the image data. According to one or more embodiments, a brightness value within the hand region of interest is determined, and hands matting is on. Thus, at block 304, the system may concurrently determine a brightness value for the region of interest, as well as a scene brightness value. In some embodiments, the brightness of the region of interest and scene brightness may be based on a same set of luminance values for sampled pixels within the image data. However, in some embodiments, different pixels may be used for each determination. Thus, if at block 304, the scene brightness exceeds a scene brightness disable threshold, then the state diagram 300 may transition back to block 302, and low-light mitigation may be turned off. In addition, hands matting will be enabled. As such, a composite image may be generated blending virtual content with pass-through camera data in accordance with a hand mask generated by hands matting.

If at block 304, a determination is made that the region of interest brightness falls below a region of interest enable threshold, then the state diagram 300 transitions to block 306, and low-light mitigation is turned on. Activating the low-light mitigation includes deactivating hands matting. As such, for image frames for which the region of interest brightness falls below the region of interest enablement threshold, composite images will be generated by blending in virtual content with pass-through scene data without regard for a hand mask. In some embodiments, a virtual hand may be rendered using hand data available from the hand tracking network, such as hand joints, hand location, and the like. In some embodiments, the virtual hand may be rendered as an alternative to using the bounding box. While the low-light mitigation is on and hands matting is off, a brightness value for the region of interest can continue to be tracked across additional frames. Upon determining that a region of interest brightness exceeds a region of interest disable threshold, the state diagram 300 returns to block 304, and hands matting is turned on. In addition, the hand region of interest brightness continues to be tracked, along with the scene brightness, determine whether the state diagram she transition to disabling low-light mitigation at block 302, and thereby ceasing the tracking of the bounding box. Alternatively, from block 304, another determination of the region of interest brightness fall below the region of interest enablement threshold, and the state diagram 300 and returned to block 306, where low-light mitigation is on, and hands matting is off.

Figure 4:
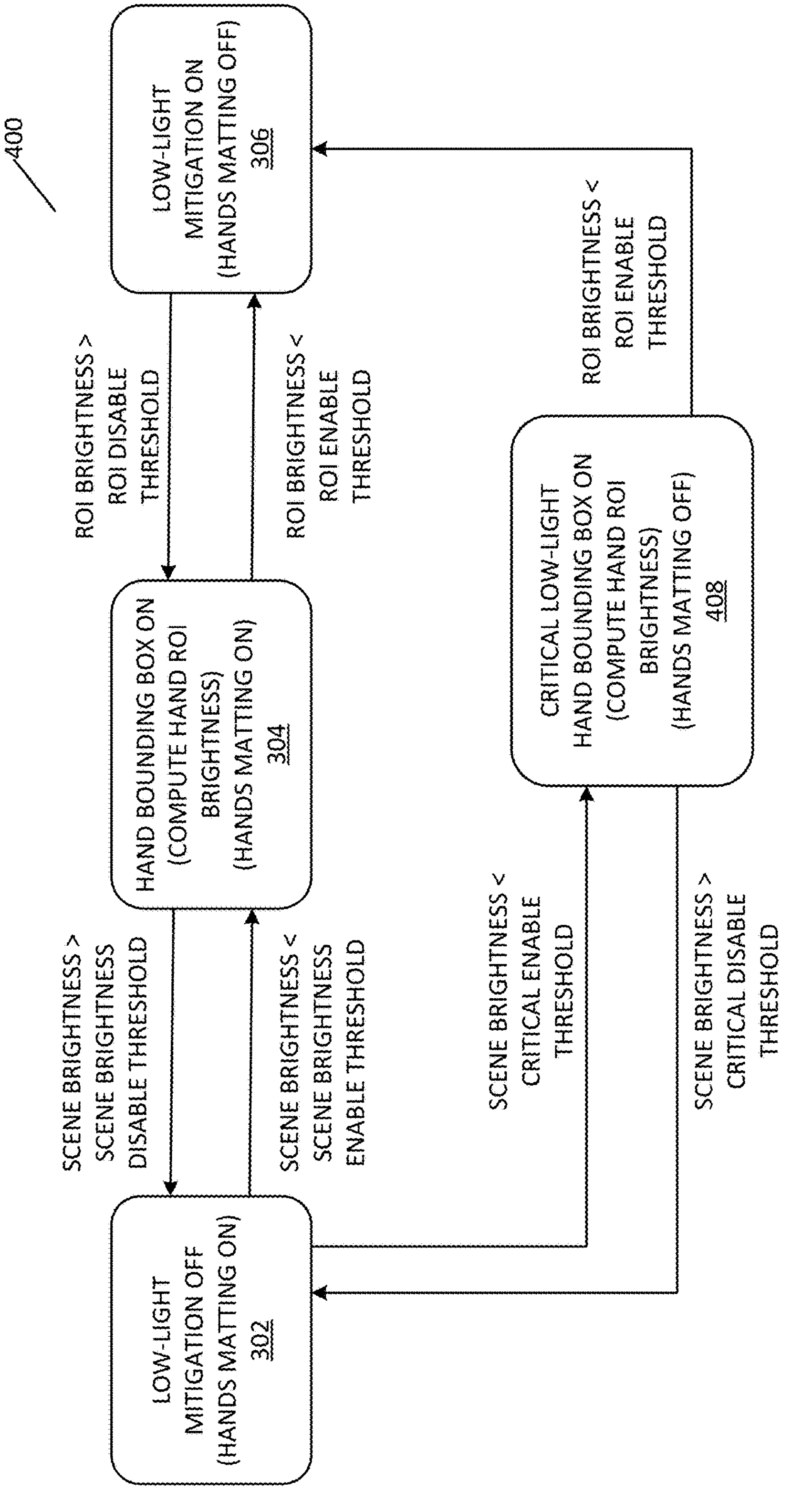
FIG. 4 shows an alternative state diagram of a technique for managing hands matting based on lighting conditions, in accordance with some embodiments.

FIG. 4 shows an alternative state diagram of a technique for managing hands matting based on lighting conditions, in accordance with some embodiments. In particular, the state machine of FIG. 3 depicts a technique for initiating and terminating a low-light mitigation function which is configured to trigger the enablement and disablement of hands matting using different threshold values than those described above with respect to FIG. 3.

Similar to FIG. 3 as described above, the state diagram 400 begins at block 302, where low-light mitigation is off. When the like mitigation is off, hands matting is enabled. As a result, composite images may be generated blending virtual content into a view of a physical environment in accordance with a hand mask provided by a hands matting pipeline. From block 302, scene brightness can be compared against a scene brightness enable threshold. If the scene brightness is determined to fall below the scene brightness enable threshold, then the state diagram 400 transitions to block 304.

At block 304, a hand bounding box is tracked. This may include, for example, enabling or initiating a hand tracking system to begin determining a bounding box around one or more of the hand scene image data. If at block 304, the scene brightness exceeds a scene brightness disable threshold, then the state diagram 400 may transition back to block 302, and low-light mitigation may be turned off. In addition, hands matting will be enabled. As such, a composite image may be generated blending virtual content with pass-through camera data in accordance with a hand mask generated by hands matting. If at block 304, a determination is made that the region of interest brightness falls below a region of interest enable threshold, then the state diagram 400 transitions to block 306, and low-light mitigation is turned on. Activating the low-light mitigation includes deactivating hands matting. Upon determining that a region of interest brightness exceeds a region of interest disable threshold, the state diagram 400 returns to block 304, and hands matting is turned on. In addition, the hand region of interest brightness continues to be tracked, along with the scene brightness, determine whether the state diagram she transition to disabling low-light mitigation at block 302, and thereby ceasing the tracking of the bounding box.

Returning to block 302, if the scene brightness is less than the critical enable threshold while low-light mitigation is off, then the state diagram transitions to block 408, where the system is determined to be a critical low-light state. While the system is in a state of critical low light, a hand bounding box is tracked while hands matting is off. This may include, for example, enabling or initiating a hand tracking system to begin determining a bounding box around one or more of the hand scene image data. However, the hands matting pipeline will not produce a hand mask for these frames. A brightness for the region of interest based on the bounding box may be determined.

While the system is in a critical low-light state, determination may be made as to whether the scene brightness for a given frame is greater than a critical enable threshold. When the scene brightness is determined to exceed the critical disable threshold, then the state diagram 400 may transition back to block 302, and low-light mitigation may be turned off. Rather, if at block 408 a determination is made that the region of interest brightness is below the region of interest enable threshold, then the state diagram 400 transitions to block 306, and low-light mitigation is turned on.

Figure 5:
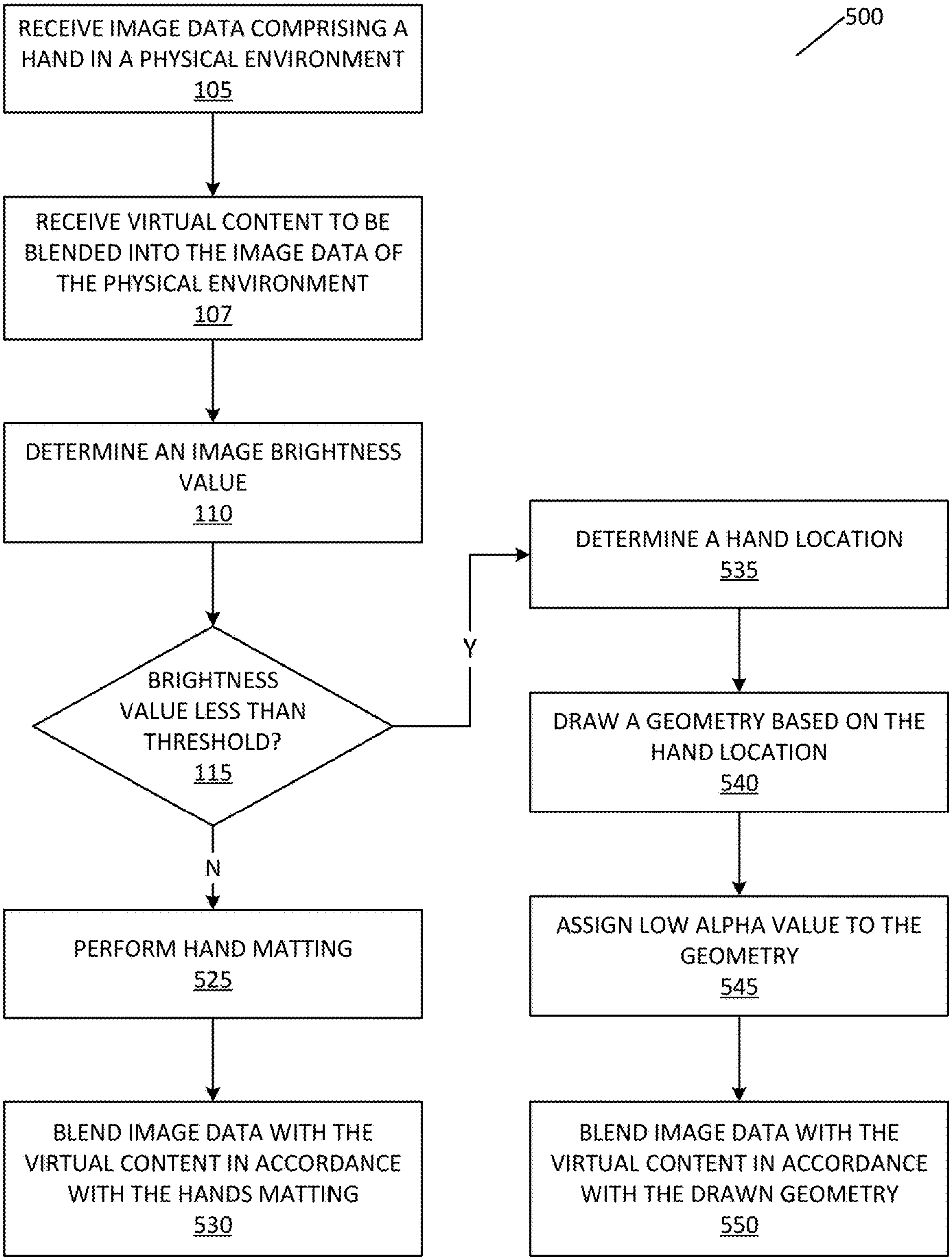
FIG. 5 shows a flowchart of a technique for blending an image of a hand with virtual content by drawing a geometry around the hand, in accordance with one or more embodiments.

In some embodiments, alternative techniques can be performed when hands matting is disabled to provide visual cues as to the location of the hand with respect to virtual content in a scene. Turning to FIG. 5, a flowchart of a technique for blending an image of a hand with virtual content by drawing a geometry around the hand is depicted. For purposes of explanation, the processes described below are described as being performed by particular components. However, it should be understood that the various actions may be performed by alternate components. In addition, the various actions may be performed in a different order. Further, some actions may be performed simultaneously, and some may not be required, or others may be added.

The flowchart 500 begins with steps 105-115, as described above with respect to FIG. 1. In short, the flowchart 500 includes, at block 105, receiving image data comprising a hand in a physical environment. At block 107 virtual content is received which is to be blended into a view of the physical environment. At block 110, an image brightness value is determined.

The flowchart 100 continues to block 115, where a determination is made whether the brightness value is less than a first threshold. The first threshold may be a critical threshold brightness at which the overall brightness of the scene is determined to be insufficient to use hands matting. If a determination is made that at block 115 that the brightness is not less than the threshold, then the flowchart proceeds to block 525. At block 525, hands matting is performed. According to some embodiments, hands matting involves performing a hands matting process to obtain or determine attributes of a hand in the image data. According to some embodiments, the hands matting process includes applying the image data to a model to obtain coefficients indicating a likelihood that a particular pixel or region of the image belongs to a hand.

The flowchart then concludes at block 530, where the image data is blended with the virtual content in accordance with the hands matting. According to one or more embodiments, the coefficients are used to blend image data, from the current image frame and/or from additional image frames, with the virtual content obtained at block 107 in a manner that provides a visual indication of the hand in space relative to virtual content in the scene.

Returning to block 115, if a determination is made that the brightness value is less than the threshold, the flowchart 500 proceeds to block 535 and a hand location is determined. According to one or more embodiments, the hand location may be determined as a point or region in space representative of the location of the hand. In some embodiments, the hand location may be determined based on hand tracking data, which may track the user's hand using additional or alternative sensor data than the hands matting process. As described above with respect to FIG. 2, the hand tracking module may use image data and/or depth data of a user's hand from sensor data 202 to determine characteristics, or attributes, of the hand. This may include, for example, joint locations, pose, depth, position, orientation, and the like. The hand tracking network used to obtain hand tracking data may differ from the model used for hands matting and may be configured to take different inputs.

The flowchart 500 proceeds to block 540, where the device draws a geometry based on the hand location. According to one or more embodiments, the geometry may be a plane in space that is configured to follow the determined location of the hand. In some embodiments, the geometry may be configured to surround all or part of the hand, a fingertip, or other portion of the user.

The flowchart 500 continues at block 545, where one or more low alpha values are assigned to the geometry. According to one or more embodiments, alpha values are assigned to content to be blended into a composite frame and indicate a level of transparency for the corresponding portion of the frame. For example, alpha values can be applied to particular pixels or regions of content. By rendering a geometry around the hand with a low alpha value, more of the pass-through camera image data under the geometry becomes visible. The low alpha value may be a predefined alpha value, or may be an alpha value assigned to be under a predefined threshold, for example.

The flowchart concludes at block 550, where the image data from the pass-through camera is blended with the virtual content in accordance with the drawn geometry. That is, the region of the frame including the geometry will show more of the camera image data of the physical environment, thereby providing a visual cue of the location of the hand with respect to virtual content in an extended reality scene.

Figure 6:
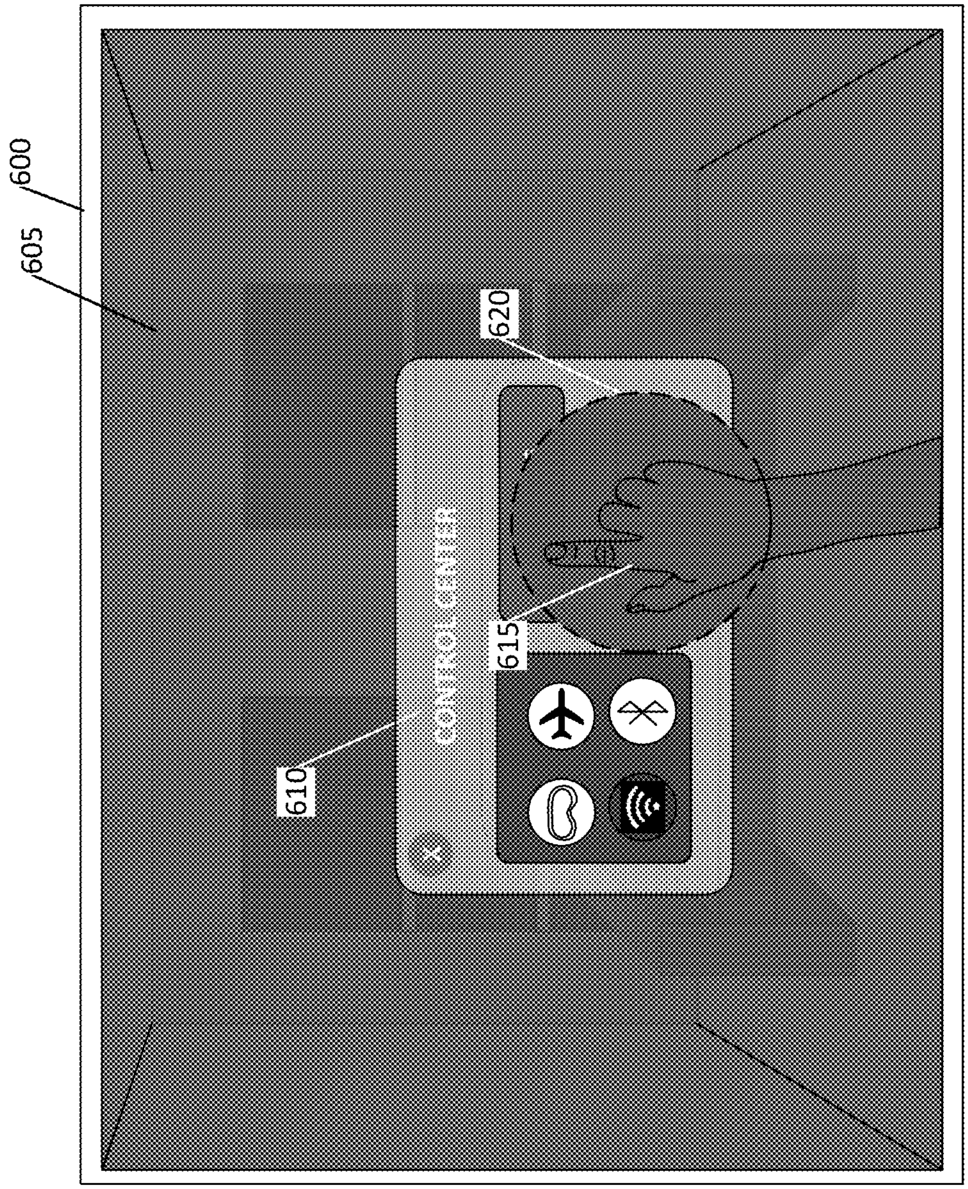
FIG. 6 shows an example diagram of a view of a composite image having camera content, virtual content, and a geometry around the hand, in accordance with one or more embodiments.

FIG. 6 shows an example diagram of a view of a composite image having camera content and virtual content, in accordance with one or more embodiments. The example diagram is intended to provide clarity as to one example outcome of the process described above with respect to FIG. 5 and is not intended to limit the processes described above with respect to FIG. 5.

In the diagram of FIG. 6, a display 600 is shown depicting an extended reality image that includes camera image data 605 of a physical environment, and virtual content 610 in the form of a user interface component. As shown, the physical environment is depicted in low light, which may make hands matting difficult or ineffective. As such, a location of the hand 615 may be identified using hand tracking. A geometry 620 is then drawn around the determined location of the hand 615 with a low alpha values such that the hand 615 is visible over the virtual content 610. In some embodiments, the geometry 620 may be drawn at a depth corresponding to a depth of the hand 615 such that the relative location of the geometry 620 and the virtual content 610 (for example, if the geometry is in front of or behind the virtual content) is apparent from how the virtual content 610 and geometry 620 are rendered.

Figure 7A:
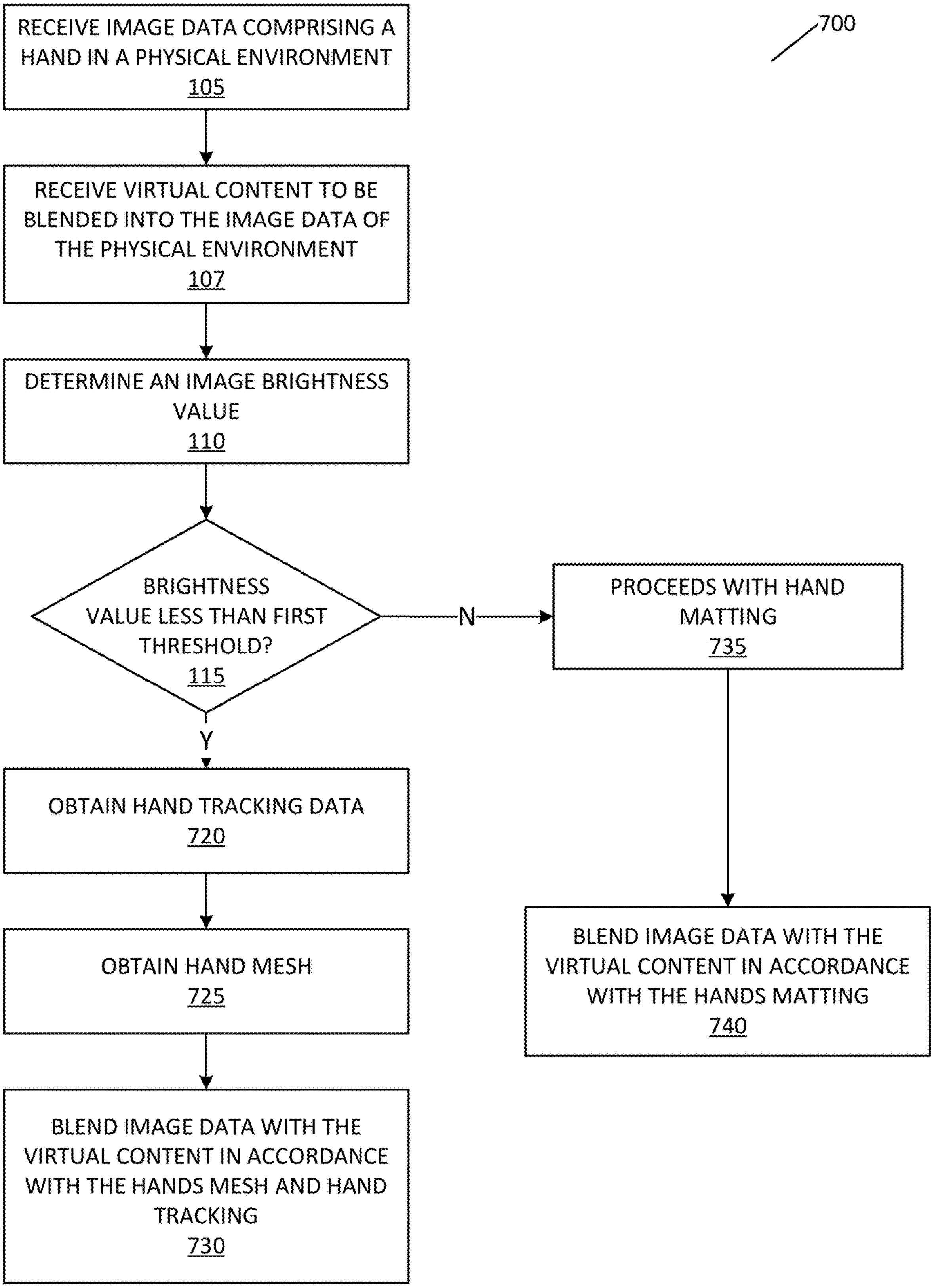
FIGS. 7A-7B depict an example flow diagram for using a hand mesh to blend image data captured by a camera with virtual content, in accordance with one or more embodiments.
Figure 7B:
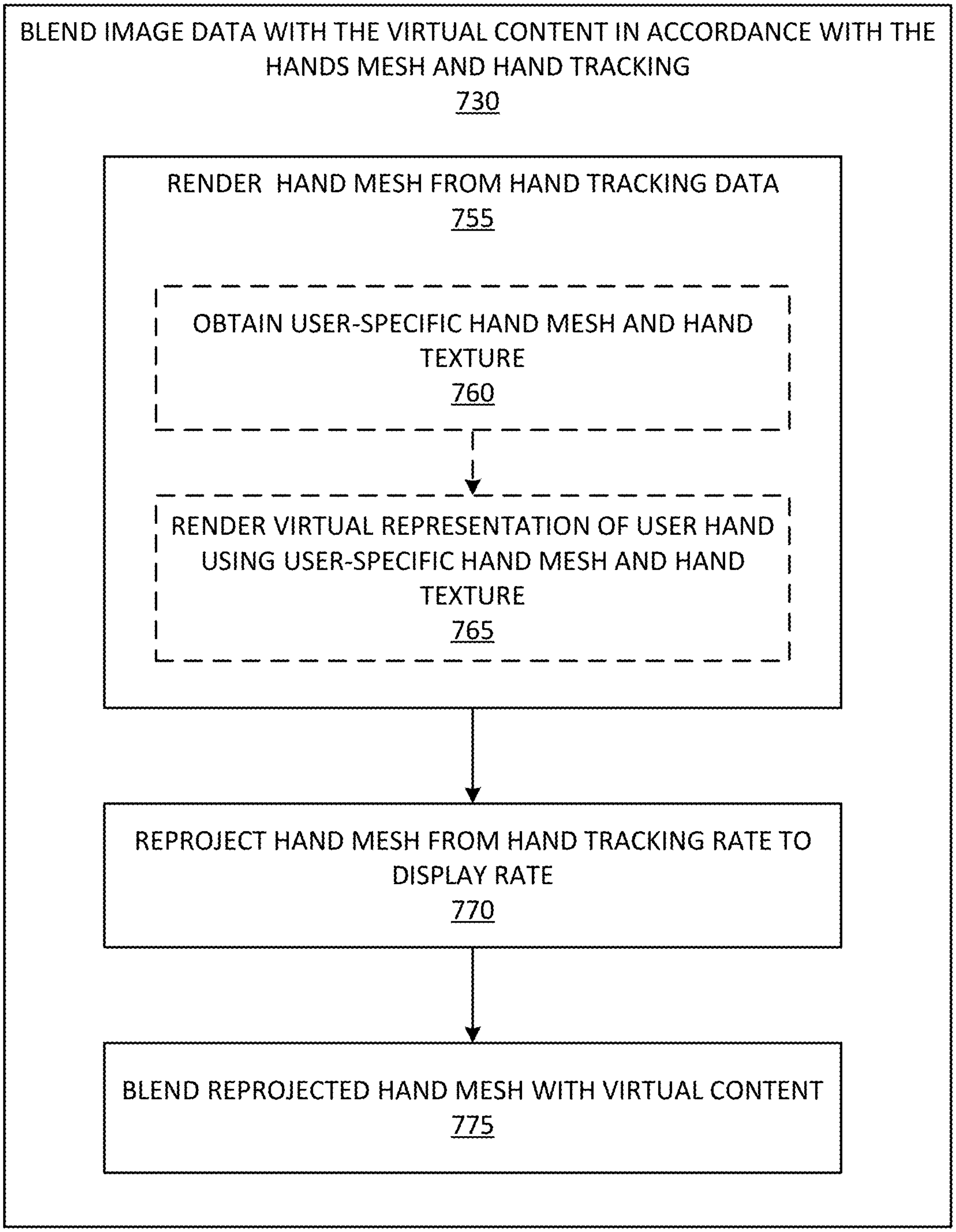

In some embodiments, a virtual hand may be rendered to provide a visual indication of a location of a user's hand relative to virtual content in a scene. FIGS. 7A-7B depict an example flow diagram for using a hand mesh to blend image data captured by a camera with virtual content, in accordance with one or more embodiments. For purposes of explanation, the processes described below are described as being performed by particular components. However, it should be understood that the various actions may be performed by alternate components. In addition, the various actions may be performed in a different order. Further, some actions may be performed simultaneously, and some may not be required, or others may be added.

The flowchart 700 begins with steps 105-115, as described above with respect to FIG. 1A. In short, the flowchart 500 includes, at block 105, receiving image data comprising a hand in a physical environment. At block 107 virtual content is received which is to be blended into a view of the physical environment. At block 110, an image brightness value is determined.

The flowchart 100 continues to block 115, where a determination is made whether the brightness value is less than a first threshold. The first threshold may be a critical threshold brightness at which the overall brightness of the scene is determined to be insufficient to use hands matting. If a determination is made that at block 115 that the brightness is not less than the threshold, then the flowchart proceeds to block 735. According to some embodiments, hands matting involves performing a hands matting process to obtain or determine attributes of a hand in the image data. According to some embodiments, the hands matting process includes applying the image data to a model to obtain coefficients indicating a likelihood that a particular pixel or region of the image belongs to a hand.

The flowchart then concludes at block 740, where the image data is blended with the virtual content in accordance with the hands matting. According to one or more embodiments, the coefficients are used to blend image data, from the current image frame and/or from additional image frames, with the virtual content obtained at block 107 in a manner that provides a visual indication of the hand in space relative to virtual content in the scene.

Returning to block 115, if a determination is made that the brightness value is less than the threshold, the flowchart 700 proceeds to block 720 and a hand location is determined. According to one or more embodiments, the hand location may be determined as a point or region in space representative of the location of the hand. In some embodiments, the hand location may be determined based on hand tracking data, which may track the user's hand using additional or alternative sensor data than the hands matting process. As described above with respect to FIG. 2, the hand tracking module may use image data and/or depth data of a user's hand from sensor data 202 to determine characteristics, or attributes, of the hand. This may include, for example, joint locations, pose, depth, position, orientation, and the like. The hand tracking network used to obtain hand tracking data may differ from the model used for hands matting and may be configured to take different inputs.

The flowchart 700 proceeds to block 725, where a hand mesh is obtained. The hand mesh may be obtained as an output from hand tracking module 204 of FIG. 2. In some embodiments, the hand tracking module 204 may be configured to generate a representation of the geometry of the hand pose, for example in the form of a mesh, a point cloud, a geometric volume, or the like. The geometric representation may be a generic hand geometry representing the pose of the hand, or may be specific to the user.

The flowchart proceeds to block 730, where the image data from the pass-through camera is blended with the virtual content in accordance with the mesh and the hand tracking data. That is, a virtual representation of a hand is rendered and presented in the pass-through image data at a position corresponding to the real user's hand to provide a visual indication of the placement of the user's hand in the scene with respect to the other virtual content.

Turning to FIG. 7B, the process of blending the image data from block 730 is described in greater detail. The flowchart begins with block 755, where a hand mesh is rendered from hand tracking data. As described above, the hand mesh may be provided by the hand tracking module 204. Additionally, or alternatively, the system may be configured to derive a hand mesh representing a geometry of the pose of the hand based on the hand tracking data from hand tracking module 204.

Optionally, as shown at block 760, a user-specific hand mesh and/or user-specific hand texture may be obtained. According to one or more embodiments, the user-specific hand mesh and/or the user-specific hand texture may be determined, in part, based on enrollment data. For example, an enrollment process may include prompting enrollment of a user's hands such that the system can capture representative views of the user's hand or hands, from which geometry and texture specific to the user can be determined. That texture and geometry can then be retried and used to determine a current user-specific mesh and texture. The flowchart then optionally proceeds to block 765, where the virtual representation of the hand is rendered using the user-specific hand mesh and hand texture. In accordance with the hand tracking data.

The flowchart proceeds to block 770, where the hand mesh is reprojected from a hand tracking frame rate to a display rate. According to one or more embodiments, the hand tracking data may be captured at a different frame rate than the frame rate at which composite images are to be displayed. As such, a reprojection may be performed to generate a rendered hand mesh for each frame to be displayed.

The flowchart concludes at block 775, where the reprojected hand mesh is then blended with the other virtual content. For example, the compositor 220 of FIG. 2 may manage the virtual image data 218 to be rendered in a view of the physical environment, as well as the rendered mesh to form a composite image in which the virtual representation of the hand in the form of the rendered hand mesh and/or hand texture is presented in the view based on the hand tracking data such that a visual cue is provided as to a relationship between the hand of the user and the virtual content from block 107.

Figure 8:
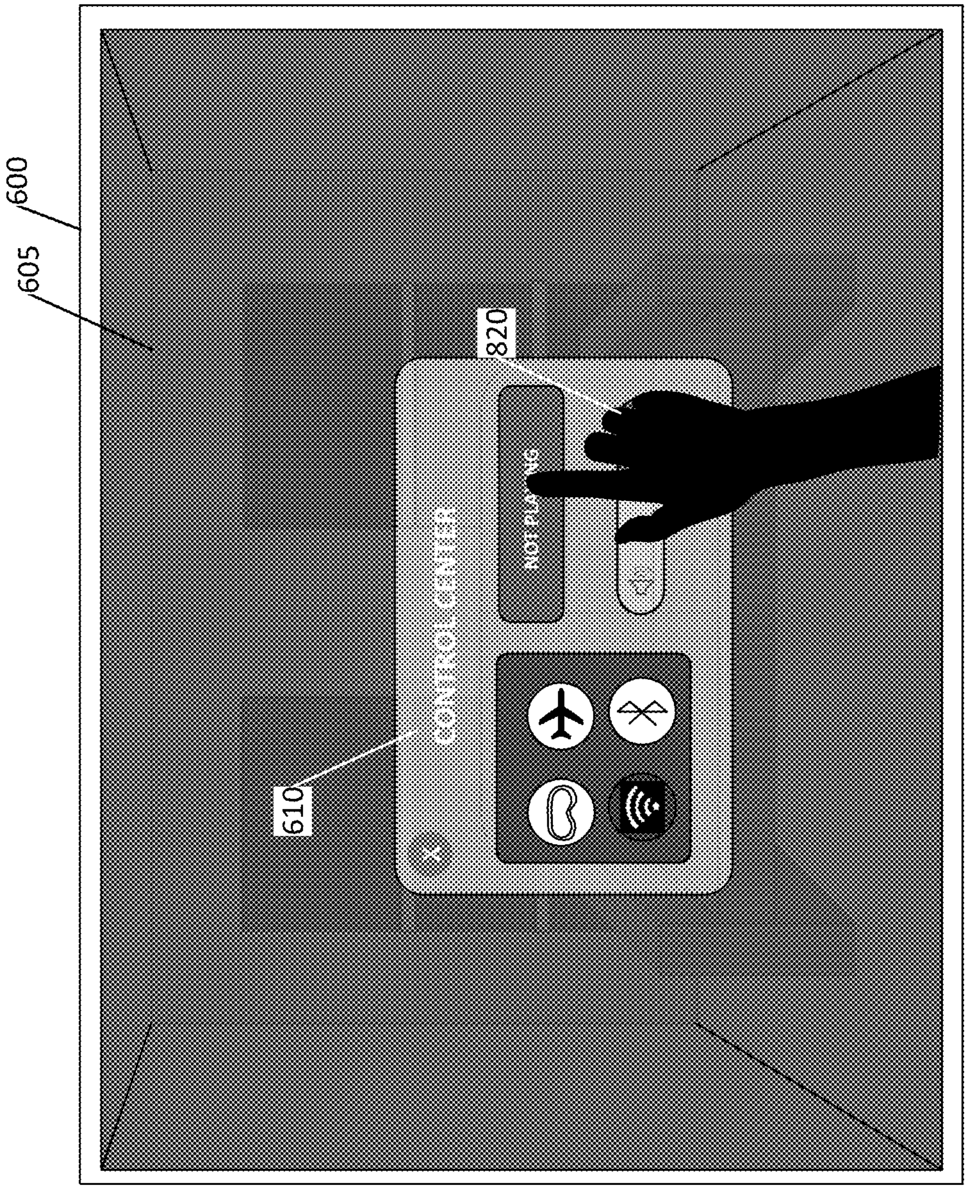
FIG. 8 shows an example diagram of a view of a composite image including a rendered hand mesh and virtual content, in accordance with one or more embodiments.

FIG. 8 shows an example diagram of a view of a composite image including a rendered hand mesh and virtual content, in accordance with one or more embodiments. The example diagram is intended to provide clarity as to one example outcome of the process described above with respect to FIGS. 7A-7B and is not intended to limit the processes described above with respect to FIGS. 7A-7B.

In the diagram of FIG. 8, a display 600 is shown depicting an extended reality image that includes camera image data 605 of a physical environment, and virtual content 610 in the form of a user interface component. As shown, the physical environment is depicted in low light, which may make hands matting difficult or ineffective. As such, a location of the hand may be identified using hand tracking. For example, a hand tracking module may produce a hand mesh. The mesh may be a three-dimensional geometric representation of the user's hand based on joint locations based on either a generic hand geometry, or a user-specific hand geometry. In the current example, a rendered mesh 820 is presented representing the placement of the hand based on a determined pose and location of the hand from hand tracking data. Because the rendered mesh 820 is a virtual object, it may be blended with the other virtual content 610 in accordance with location information for each of the components. For example, if the hand is closer to the user than the virtual content 610, then the rendered mesh 820 will appear on top of the virtual content. By contrast, if the hand is located behind the virtual content, then the rendered mesh 820 may appear behind the virtual content 610.

Figure 9:
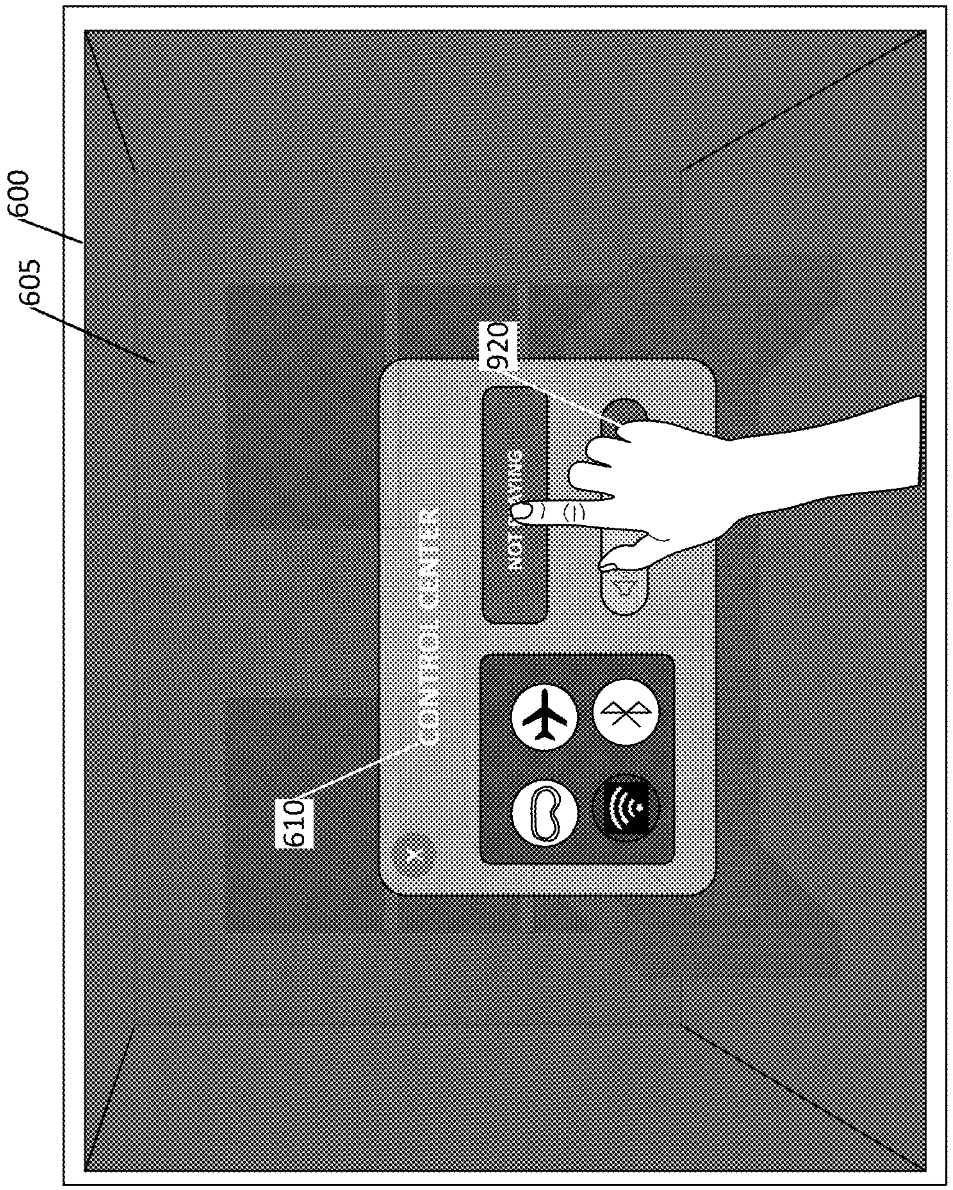
FIG. 9 shows an example diagram of a view of a composite image including a virtual representation of a hand and virtual content, in accordance with one or more embodiments.

FIG. 9 depicts an alternate example diagram in which a virtual hand 920 is rendered based on user-specific hand attributes. In FIG. 9, a display 600 is shown depicting an extended reality image that includes camera image data 605 of a physical environment, and virtual content 610 in the form of a user interface component. Again, a location of the hand may be identified using hand tracking. For example, a hand tracking module may produce a hand mesh. The mesh may be a three-dimensional geometric representation of the user's hand based on joint locations based on a user-specific hand geometry. For example, the system may be configured to track joint locations or other attributes of the hand and use pre-defined user-specific data, such as enrollment data, for the user-specific hand geometry to generate a user-specific mesh. Further, the system may be configured to use the pre-defined user-specific data for the user-specific hand texture to render a texture over the user-specific mesh. Thus, the virtual hand 920 is presented in a manner which is more visible to the user.

Further, because the virtual hand 920 is a virtual object, it may be blended with the other virtual content 610 in accordance with location information for each of the components. For example, if the hand is closer to the user than the virtual content 610, then the virtual hand 920 will appear on top of the virtual content. By contrast, if the hand is located behind the virtual content, then the virtual hand 920 may appear behind the virtual content 610.

Figure 10:
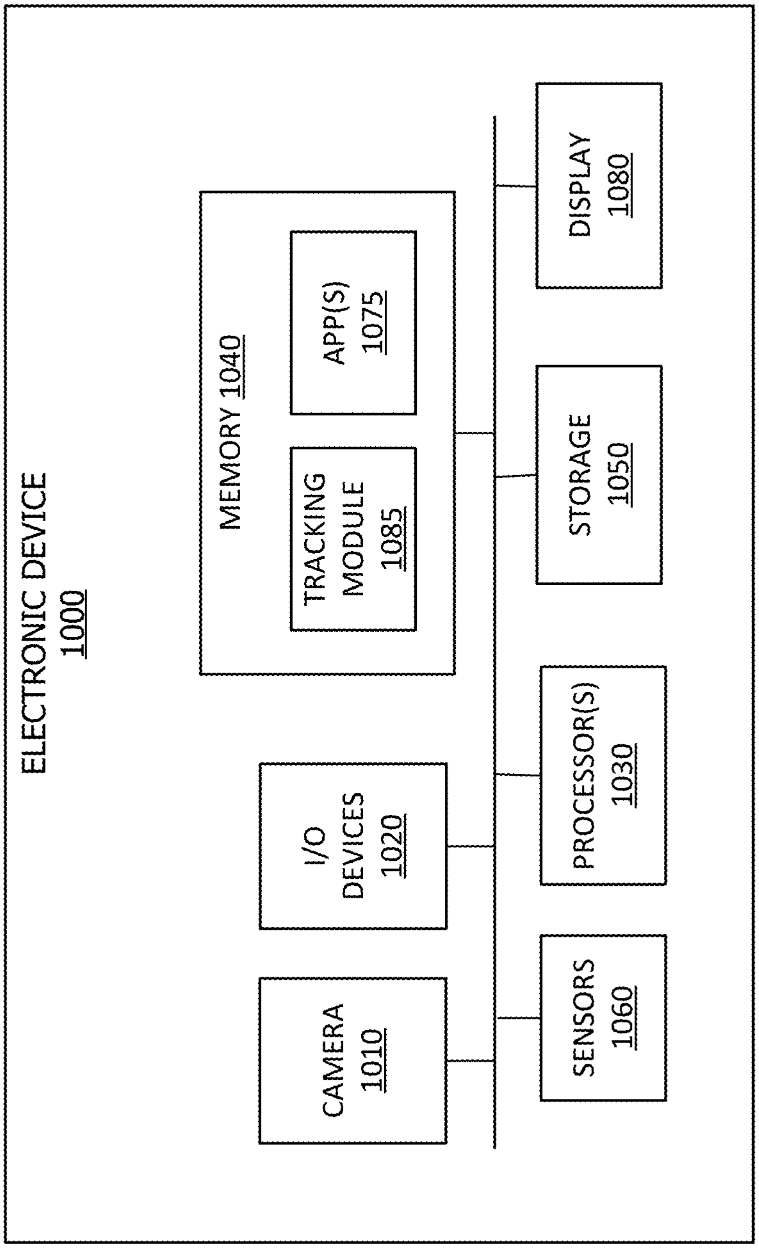
FIG. 10 shows, in block diagram form, a simplified system diagram according to one or more embodiments.

Referring to FIG. 10, a simplified block diagram of an electronic device 1000 which may be utilized to generate and display mixed reality scenes. The system diagram includes electronic device 1000 which may include various components. Electronic device 1000 may be part of the multifunctional device, such as phone, tablet computer, personal digital assistant, portable music/video player, wearable device, head mounted device, base station, laptop computer, desktop computer, network device, or any other electronic device that has the ability to capture image data.

Electronic device 1000 may include one or more processors 1030, such as a central processing unit (CPU). Processors 1030 may include a system-on-chip such as those found in mobile devices and include one or more dedicated graphics processing units (GPUs) or other graphics hardware. Further, processor(s) 1030 may include multiple processors of the same or different type. Electronic device 1000 may also include a memory 1040. Memory 1040 may include one or more different types of memory, which may be used for performing device functions in conjunction with processors 1030. Memory 1040 may store various programming modules for execution by processor(s) 1030, including tracking module 1085, and other various applications 1075 which may produce virtual content. Electronic device 1000 may also include storage 1050. Storage 1050 may include data utilized by the tracking module 1085 and/or applications 1075. For example, storage 1050 may be configured to store user profile data, media content to be displayed as virtual content, and the like, for example on display 1080.

In some embodiments, the electronic device 1000 may include other components utilized for vision-based tracking, such as one or more cameras 1010 and/or other sensors, such as one or more depth sensors 1060. In one or more embodiments, each of the one or more cameras 1010 may be a traditional RGB camera, IR camera, a depth camera, or the like. Further, cameras 1010 may include a stereo or other multi camera system, a time-of-flight camera system, or the like which capture images from which depth information of the scene may be determined. Cameras 1010 may include cameras incorporated into electronic device 1000 capturing different regions, for example from different perspectives. For example, cameras 1010 may include one or more scene cameras and one or more user-facing cameras, such as eye tracking cameras or body tracking cameras. Electronic device 1000 may additionally include one or more I/O devices 1020, which may be configured to allow a user to interact with the electronic device, such as keyboards, input components, speakers, or the like.

In one or more embodiments, tracking module 1085 may track user characteristics, such as a location of a hand. The tracking module 1085 may determine whether a user's hand is occupied, for example when a user is interacting with a physical object in the environment.

Although electronic device 1000 is depicted as comprising the numerous components described above, and one or more embodiments, the various components and functionality of the components may be distributed differently across one or more additional devices, for example across a network. In some embodiments, any combination of the data or applications may be partially or fully deployed on additional devices, such as network devices, network storage, and the like. Similarly, in some embodiments, the functionality of tracking module 1085 and applications 1075 may be partially or fully deployed on additional devices across a network.

Further, in one or more embodiments, electronic device 1000 may be comprised of multiple devices in the form of an electronic system. Accordingly, although certain calls and transmissions are described herein with respect to the particular systems as depicted. In one or more embodiments, the various calls and transmissions may be differently directed based on the differently distributed functionality. Further, additional components may be used, or some combination of the functionality of any of the components may be combined.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include: head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 11:
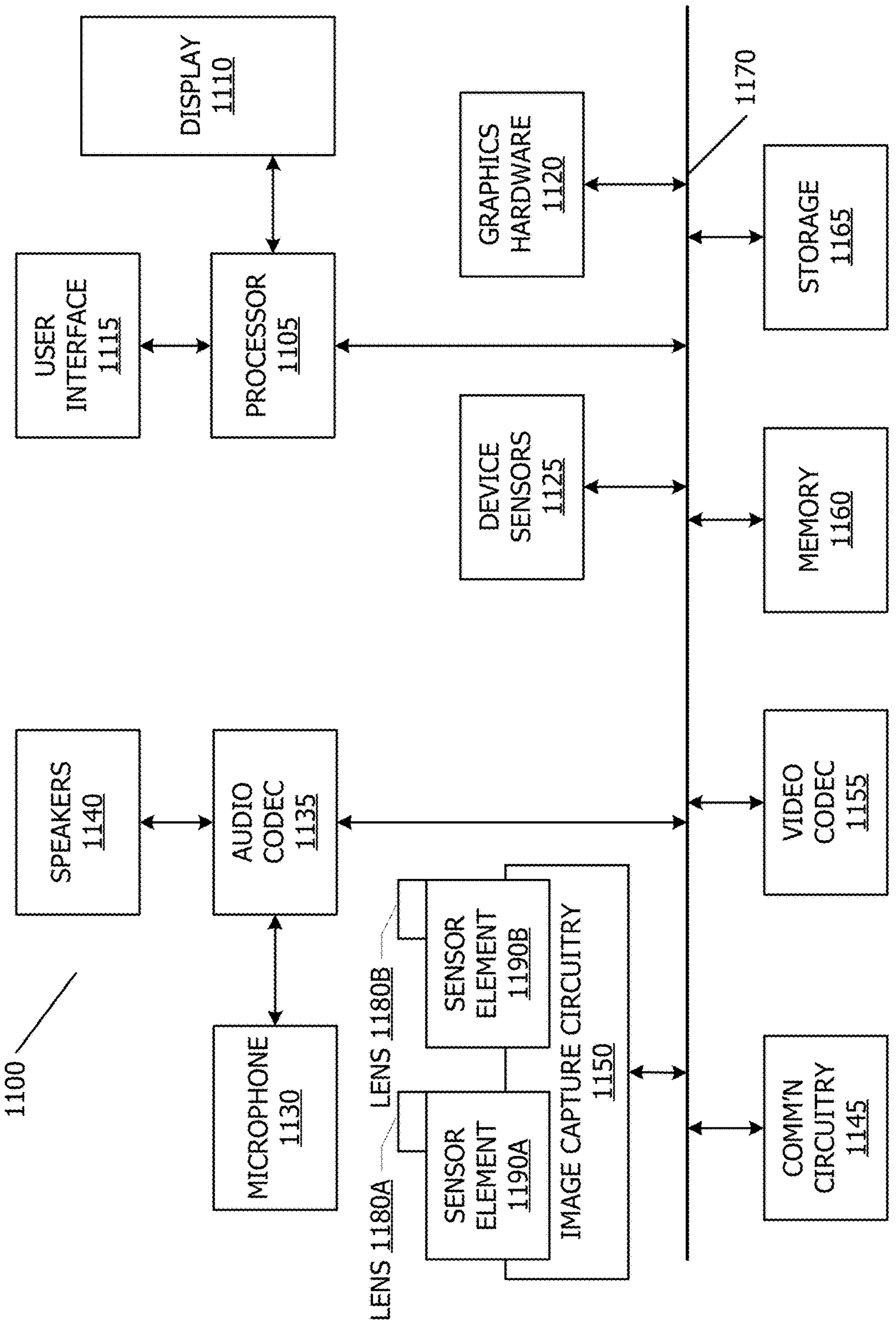
FIG. 11 shows, in block diagram form, a computer system in accordance with one or more embodiments.

Referring now to FIG. 11, a simplified functional block diagram of illustrative multifunction electronic device 1100 is shown according to one embodiment. Each of electronic devices may be a multifunctional electronic device, or may have some or all of the described components of a multifunctional electronic device described herein. Multifunction electronic device 1100 may include some combination of processor 1105, display 1110, user interface 1115, graphics hardware 1120, device sensors 1125 (e.g., proximity sensor/ambient light sensor, accelerometer and/or gyroscope), microphone 1130, audio codec 1135, speaker(s) 1140, communications circuitry 1145, digital image capture circuitry 1150 (e.g., including camera system), memory 1160, storage device 1165, and communications bus 1170. Multifunction electronic device 1100 may be, for example, a mobile telephone, personal music player, wearable device, tablet computer, and the like.

Processor 1105 may execute instructions necessary to carry out or control the operation of many functions performed by device 1100. Processor 1105 may, for instance, drive display 1110 and receive user input from user interface 1115. User interface 1115 may allow a user to interact with device 1100. For example, user interface 1115 can take a variety of forms, such as a button, keypad, dial, a click wheel, keyboard, display screen, touch screen, and the like. Processor 1105 may also, be a system-on-chip such as those found in mobile devices and include a dedicated graphics processing unit (GPU). Processor 1105 may be based on reduced instruction-set computer (RISC) or complex instruction-set computer (CISC) architectures or any other suitable architecture and may include one or more processing cores. Graphics hardware 1120 may be special purpose computational hardware for processing graphics and/or assisting processor 1105 to process graphics information. In one embodiment, graphics hardware 1120 may include a programmable GPU.

Image capture circuitry 1150 may include one or more lens assemblies, such as 1180A and 1180B. The lens assemblies may have a combination of various characteristics, such as differing focal length and the like. For example, lens assembly 1180A may have a short focal length relative to the focal length of lens assembly 1180B. Each lens assembly may have a separate associated sensor element 1190. Alternatively, two or more lens assemblies may share a common sensor element. Image capture circuitry 1150 may capture still images, video images, enhanced images, and the like. Output from image capture circuitry 1150 may be processed, at least in part, by video codec(s) 1155 and/or processor 1105 and/or graphics hardware 1120, and/or a dedicated image processing unit or pipeline incorporated within circuitry 1145. Images so captured may be stored in memory 1160 and/or storage 1165.

Memory 1160 may include one or more different types of media used by processor 1105 and graphics hardware 1120 to perform device functions. For example, memory 1160 may include memory cache, read-only memory (ROM), and/or random-access memory (RAM). Storage 1165 may store media (e.g., audio, image, and video files), computer program instructions or software, preference information, device profile information, and any other suitable data. Storage 1165 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 1160 and storage 1165 may be used to tangibly retain computer program instructions or computer readable code organized into one or more modules and written in any desired computer programming language. When executed by, for example, processor 1105 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1-5 and 7A-B, or the arrangement of elements shown in FIGS. 1, 6, 8, and 10-11 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:

receive an image data stream comprising a series of frames in which a hand is captured; and in accordance with a first brightness value for a first portion of the image data stream satisfying a first brightness threshold:

identify a set of pixels of one or more of the series of frames corresponding to the hand, and blend the image data stream with virtual content to provide a visual indication of the hand relative to the virtual content based on the set of pixels.

2. The non-transitory computer readable medium of claim 1, wherein the computer readable code to identify the set of pixels of the one or more of the series of frames corresponding to the hand is comprised in a hands matting process, and further comprising computer readable code to, in accordance with a determination that that a second brightness value for a second portion of the image data stream fails to satisfy the first brightness threshold, disable the hands matting process.

3. The non-transitory computer readable medium of claim 2, wherein the hands matting process is performed using a first hands matting model in accordance with the first brightness value satisfying the first brightness threshold, and further comprising computer readable code to:

in accordance with a determination that a second brightness value for a second portion of the image data stream fails to satisfy a first brightness threshold, perform the hands matting process on the image data stream using a second hands matting model.

4. The non-transitory computer readable medium of claim 1, wherein identifying the set of pixels of the one or more of the series of frames corresponding to the hand is comprised in a hands matting process, and further comprising computer readable code to:

in accordance with a determination that a second brightness value for a second portion of the image data stream fails to satisfy a second brightness threshold:

determine a hand region in the second portion of the image data stream, determine a brightness of the hand region, and in accordance with a determination that the brightness in the hand region of the second portion of the image data stream fails to satisfy a third brightness threshold, disable the hands matting process.

5. The non-transitory computer readable medium of claim 4, further comprising computer readable code to:

in accordance with a determination that a third brightness value for a third portion of the image data stream fails to satisfy a fourth brightness threshold:

enable the hands matting process.

6. The non-transitory computer readable medium of claim 5, wherein the fourth brightness threshold is greater than the third brightness threshold.

7. The non-transitory computer readable medium of claim 1, wherein the first brightness value for the first portion of the image data stream is determined based on a median luminance of a set of pixels of the first portion of the image data stream.

8. The non-transitory computer readable medium of claim 1, wherein the computer readable code to identify the set of pixels of the one or more of the series of frames corresponding to the hand comprises computer readable code to:

select an alternative camera source in accordance with the first brightness value of the first portion of the image data stream;

obtain additional image data from the alternative camera source;

reproject the first portion of the image data stream to the additional image data; and identify attributes of the hand from the first portion of the image data stream in accordance with the reprojection.

9. A system comprising:

one or more processors; and one or more computer readable media comprising computer readable code executable by the one or more processors to:

receive an image data stream comprising a series of frames in which a hand is captured; and in accordance with a first brightness value for a first portion of the image data stream satisfying a first brightness threshold:

identify a set of pixels of one or more of the series of frames corresponding to the hand, and blend the image data stream with virtual content to provide a visual indication of the hand relative to the virtual content based on the set of pixels.

10. The system of claim 9, wherein the computer readable code to identify the set of pixels of the one or more of the series of frames corresponding to the hand is comprised in a hands matting process, and further comprising computer readable code to, in accordance with a determination that that a second brightness value for a second portion of the image data stream fails to satisfy the first brightness threshold, disable the hands matting process.

11. The system of claim 10, wherein the hands matting process is performed using a first hands matting model in accordance with the first brightness value satisfying the first brightness threshold, and further comprising computer readable code to:

in accordance with a determination that a second brightness value for a second portion of the image data stream fails to satisfy a first brightness threshold, perform the hands matting process on the image data stream using a second hands matting model.

12. The system of claim 9, wherein identifying the set of pixels of the one or more of the series of frames corresponding to the hand is comprised in a hands matting process, and further comprising computer readable code to:

in accordance with a determination that a second brightness value for a second portion of the image data stream fails to satisfy a second brightness threshold:

determine a hand region in the second portion of the image data stream, determine a brightness of the hand region, and in accordance with a determination that the brightness in the hand region of the second portion of the image data stream fails to satisfy a third brightness threshold, disable the hands matting process.

13. A method comprising:

receiving an image data stream comprising a series of frames in which a hand is captured; and in accordance with a first brightness value for a first portion of the image data stream satisfying a first brightness threshold:

identifying a set of pixels of one or more of the series of frames corresponding to the hand, and blending the image data stream with virtual content to provide a visual indication of the hand relative to the virtual content based on the set of pixels.

14. The method of claim 13, wherein identifying the set of pixels of the one or more of the series of frames corresponding to the hand is comprised in a hands matting process, and further comprising:

in accordance with a determination that that a second brightness value for a second portion of the image data stream fails to satisfy the first brightness threshold, disabling the hands matting process.

15. The method of claim 14, wherein the hands matting process is performed using a first hands matting model in accordance with the first brightness value satisfying the first brightness threshold, and further comprising:

in accordance with a determination that a second brightness value for a second portion of the image data stream fails to satisfy a first brightness threshold, performing the hands matting process on the image data stream using a second hands matting model.

16. The method of claim 13, wherein identifying the set of pixels of the one or more of the series of frames corresponding to the hand is comprised in a hands matting process, and further comprising:

in accordance with a determination that a second brightness value for a second portion of the image data stream fails to satisfy a second brightness threshold:

determining a hand region in the second portion of the image data stream, determining a brightness of the hand region, and in accordance with a determination that the brightness in the hand region of the second portion of the image data stream fails to satisfy a third brightness threshold, disabling the hands matting process.

17. The method of claim 16, further comprising:

in accordance with a determination that a third brightness value for a third portion of the image data stream fails to satisfy a fourth brightness threshold:

enabling the hands matting process.

18. The method of claim 17, wherein the fourth brightness threshold is greater than the third brightness threshold.

19. The method of claim 13, wherein the first brightness value for the first portion of the image data stream is determined based on a median luminance of a set of pixels of the first portion of the image data stream.

20. The method of claim 13, wherein identifying the set of pixels of the one or more of the series of frames corresponding to the hand comprises:

selecting an alternative camera source in accordance with the first brightness value of the first portion of the image data stream;

obtaining additional image data from the alternative camera source;

reprojecting the first portion of the image data stream to the additional image data; and identifying attributes of the hand from the first portion of the image data stream in accordance with the reprojection.

* * * * *